United States Patent
Chiu et al.

(10) Patent No.: US 7,154,821 B2
(45) Date of Patent: Dec. 26, 2006

(54) COMPENSATION METHOD FOR DETECTING THE SEEKING SPEED OF AN OPTICAL DISK DRIVE

(75) Inventors: Shih-Jung Chiu, Anding Township, Tainan County (TW); Hsu-Feng Ho, Taipei (TW)

(73) Assignee: Mediatek Inc. (TW)

( * ) Notice: Subject to any disclaimer, the term of this patent is extended or adjusted under 35 U.S.C. 154(b) by 297 days.

(21) Appl. No.: 10/711,656

(22) Filed: Sep. 29, 2004

(65) Prior Publication Data

US 2005/0088926 A1    Apr. 28, 2005

(30) Foreign Application Priority Data

Oct. 22, 2003  (TW) ............... 92129345 A

(51) Int. Cl.
G11B 7/00    (2006.01)
(52) U.S. Cl. .................................. 369/44.28
(58) Field of Classification Search ............ None
See application file for complete search history.

(56) References Cited

U.S. PATENT DOCUMENTS

| | | | |
|---|---|---|---|
| 4,858,214 A * | 8/1989 | Baba ........................ | 369/44.28 |
| 4,876,679 A | 10/1989 | Mukai | |
| 4,959,823 A | 9/1990 | Gretreuer et al. | |
| 5,038,333 A | 8/1991 | Chow et al. | |
| 5,042,019 A | 8/1991 | Kitai | |
| 5,140,574 A | 8/1992 | Cloetens et al. | |
| 5,172,353 A * | 12/1992 | Ito ............................ | 369/44.28 |
| 5,239,530 A * | 8/1993 | Seo et al. ................ | 369/44.28 |
| 5,323,368 A * | 6/1994 | Semba ..................... | 369/44.28 |
| 5,426,625 A | 6/1995 | Bui et al. | |
| 5,440,535 A * | 8/1995 | Takagi et al. ............ | 369/44.28 |
| 5,457,671 A | 10/1995 | Takata et al. | |
| 5,563,856 A * | 10/1996 | Kim ......................... | 369/44.28 |
| 5,563,858 A * | 10/1996 | Fuji ......................... | 369/44.28 |
| 5,623,461 A | 4/1997 | Sohmuta | |
| 5,878,006 A * | 3/1999 | Jung ........................ | 369/44.28 |
| 5,914,922 A * | 6/1999 | Supino et al. ........... | 369/44.28 |
| 6,157,599 A | 12/2000 | Yamashita et al. | |
| 6,400,662 B1 * | 6/2002 | Choi et al. ............... | 369/44.28 |
| 7,099,241 B1 * | 8/2006 | Buchler et al. .......... | 369/44.26 |

* cited by examiner

*Primary Examiner*—Thang V. Tran
(74) *Attorney, Agent, or Firm*—Connolly Bove Lodge & Hutz, LLP; Larry J. Hume

(57) ABSTRACT

A compensation method for detecting the seeking speed of an optical disk drive involves the following steps. First, a TE signal is converted into a TEZC signal, or an RFRP signal is converted into an RFZC signal. Then, take the average of the respective pulse widths of an upper waveform and an adjoining lower waveform of the TEZC signal or the RFZC signal to acquire the recovered TEZC signal or RFZC signal wherein both the upper waveform and the lower waveform are decided by a slice levels.

13 Claims, 4 Drawing Sheets

COMPENSATION METHOD FOR DETECTING THE SEEKING SPEED OF AN OPTICAL DISK DRIVE

BACKGROUND OF THE INVENTION

1. Field of the Invention

The present invention relates to a compensation method for detecting the seeking speed of an optical disk drive and more particularly to an average compensation method of tracking error (TE) signals while the pick-up head of an optical disk drive seeks the tracks of an optical disk.

2. Description of the Related Art

For an optical disk drive to operate, an electromechanical actuator drives a pick-up head so as to focus laser beams to the surface of an optical disk. Then, any binary data stored is read and judged by the magnitude of the light rays reflected to a photo-detector; meanwhile, the reflective rays are used as servo control signals for driving the pick-up head. In other words, the laser beams are accurately focused on a right track, using such an optical signal to drive the pick-up head.

During the process of track seeking and track locking performed on optical disks, there is a sine waveform or a triangular waveform with a phase difference of approximately 90° between a TE (Track Error) signal and an RF ripple (RFRP) signal. For a DVD optical disk, the triangular wave mostly functions as the track error signal. As shown in FIG. 1, a digitized TE zero cross (TEZC) signal can be determined if the slice level of the track error is treated as a threshold, and the digitized RF ripple zero cross (RFZC) signal can be determined by means of the slice level of the RFRP signal. An optical disk drive calculates the number of tracks to be sought by the pick-up head, using the TEZC signal or the RFZC signal. In general, a half-track count with regard to the TEZC signal is performed with a clock counter, and then the seeking speed is derived from the count. The detected value of the seeking speed assists the feedback control of the seeking speed of the pick-up head.

FIG. 2 is a waveform diagram of the distorted driving signals for an optical disk drive due to the shift in a slice level. In comparison with FIG. 1, FIG. 2 shows that, owing to the slice level shift, both the upper half cycles and the lower half cycles (relative to the slice level) of the TE signal and the RFRP signal are asymmetric, leading to the distortion of the TEZC signal and RFZC signal; as a result, alternate half-track speed fluctuates. If the servo control system executes speed feedback or speed-related control procedure by means of the aforesaid distorted half-track speed, the control exercised by the pick-up head and the accuracy thereof deteriorates inevitably.

SUMMARY OF THE INVENTION

The objective of the present invention is to provide a compensation method for detecting the seeking speed of an optical disk drive, which is capable of preventing the incorrect calculation of the seeking speed that may otherwise arise from the slice level shift of the TE signal and RFRP signal. The present invention involves determining the real seeking speed of a pick-up head with the moving average method, so as to provide control-related applications required for the optical disk drive servo system.

In order to achieve the objective, the present invention discloses a compensation method for detecting the seeking speed of an optical disk drive, which involves the following steps. First, a TE signal is converted into a TEZC signal, or an RFRP signal is converted into an RFZC signal. Then, take the average of the respective pulse widths of an upper waveform and an adjoining lower waveform of the TEZC signal or the RFZC signal wherein both the upper waveform and the lower waveform are decided by a slice level. Lastly, the pulse width of the upper waveform or the lower waveform is set to the average all over again, so as to acquire the recovered TEZC signal or RFZC signal.

BRIEF DESCRIPTION OF THE DRAWINGS

The invention will be described according to the appended drawings in which.

PREFERRED EMBODIMENT OF THE PRESENT INVENTION

Figure 1:
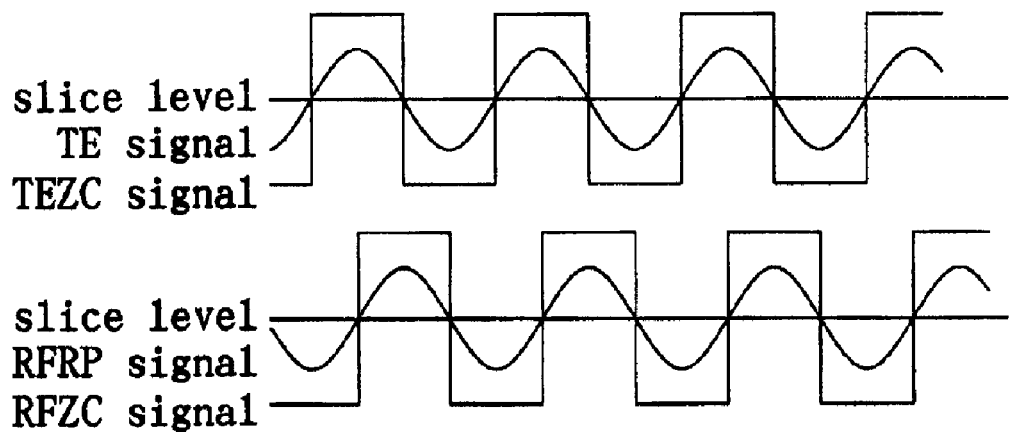
FIG. 1 is a conventional waveform diagram of a TEZC signal and an RFZC signal.
Figure 2:
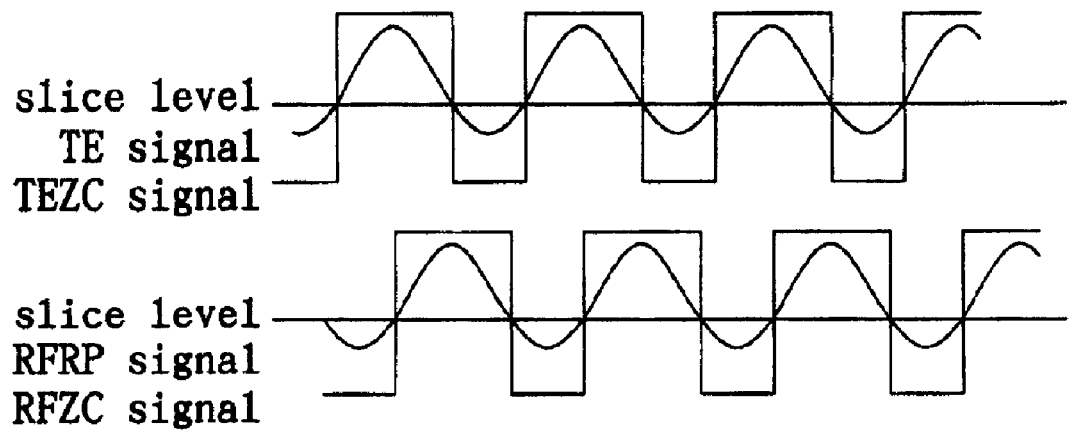
FIG. 2 is a conventional waveform diagram of a TEZC signal and an RFZC signal.
Figure 3:
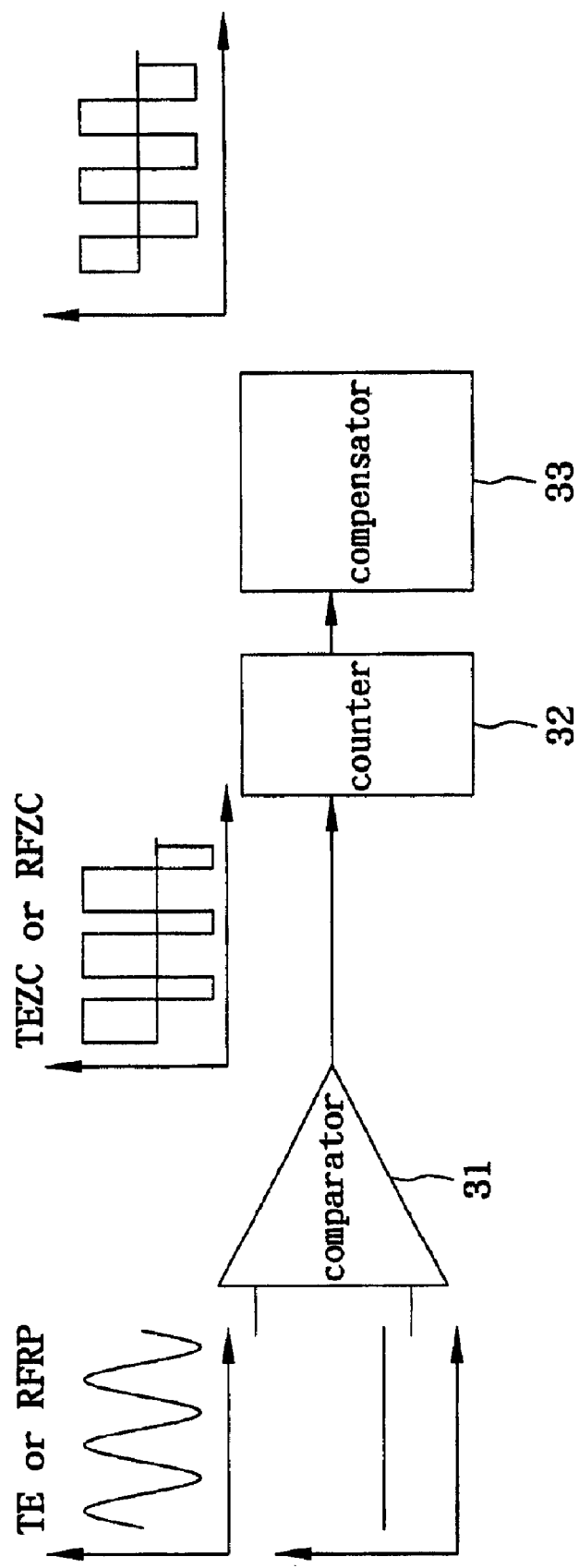
FIG. 3 is a diagram of the waveforms and the circuit in accordance with the compensation method of the present invention.

FIG. 3 is a schematic diagram of the circuit and waveforms in accordance with the compensation method of the present invention. In the circuit, a TE signal or an RFRP signal functions as an input signal to a comparator 31, and a slice level signal functions as another input signal to the comparator 31. Assuming the slice level signal deviates from the center value of the TE signal which is a sine wave, the waveforms of the TEZC signal or the RFZC signal generated by the comparator 31 become distorted, or, in other words, the percentage of the duty cycle is not equal to 50%. Then, according to the present invention, the corresponding pulse width of every upper half cycle and every lower half cycle is calculated with a counter 32. Lastly, according to the present invention, a compensator 33 averages the corresponding pulse widths of the upper cycles and the lower cycles so as to determine a recovered, correct waveform. The compensator may also be an average value calculator that calculates the average pulse width and generates it as an output.

Figure 4:
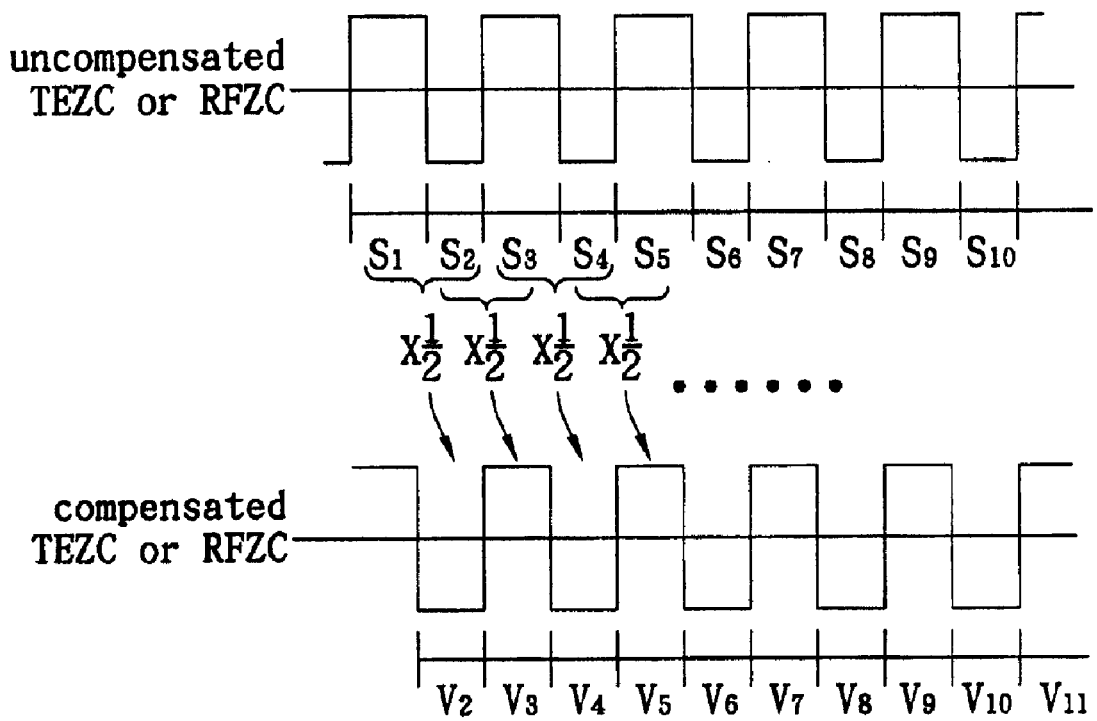
FIG. 4 is a waveform diagram of the compensation method in accordance with the present invention.
Figure 5:
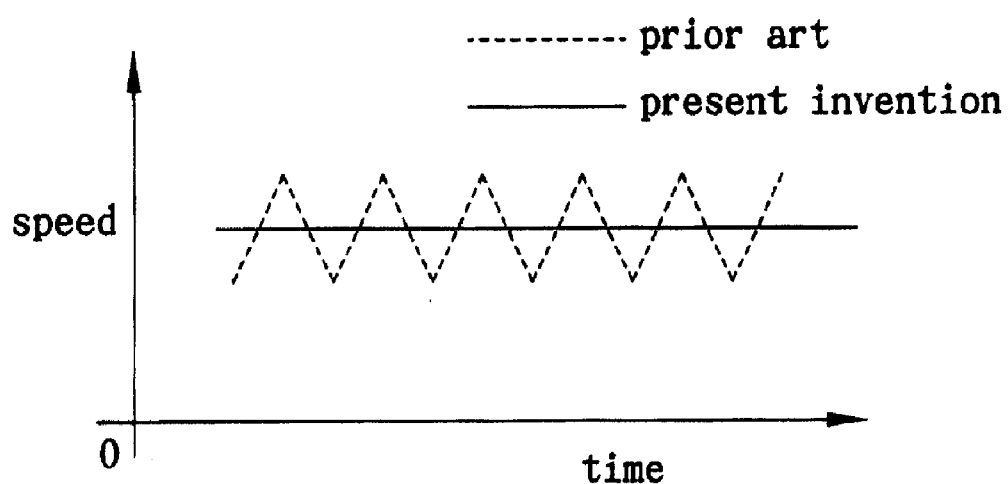
FIG. 5 is a seeking speed graph in comparison between the present invention and a prior art.

FIG. 4 is a diagram of the waveforms in accordance with the compensation method of the present invention. Since the waveforms of the first row represents a uncompensated TEZC signal or a uncompensated RFZC signal, the upper half cycle and adjoining lower half cycle, both of them correspond to the slice level, are not equal in pulse width, for instance, $S_1 > S_2$. If the distorted TEZC signal or RFZC signal is directly converted into a seeking speed, the seeking speed fluctuates as indicated by the seeking speed curve in accordance with a prior art (as shown in FIG. 5).

A moving average compensation method is put forth by the present invention to solve the aforesaid problem, which can be expressed in the following simple equation:

$$V_i = \frac{(S_{i-1} + S_i)}{2};$$

wherein $S_i$ denotes the time taken to pass through a half track, that is, the corresponding pulse width of the upper half cycle or the lower half cycle decomposed from the TEZC signal or the RFZC signal, and $V_i$ denotes the time taken to seek a half track after being processed with the moving average compensation method. As shown in FIG. 4, it is expressly indicated that, after the TEZC signal or the RFZC signal is processed with the compensation method, $V_2=(S_1+S_2)/2$, $V_3=(S_2+S_3)/2$ and $V_4=(S_3+S_4)/2$, and the remaining values of $V_i$ may be deduced by analogy. Whoever is familiar with this technique would be able to understand that it is feasible to acquire the benefit of the present invention by reading the times taken to seek any even number of contiguous half tracks and then taking the average of the measured times.

Hence, according to the present invention, the moving average compensation method always results in the expression $V_i=V_{i-1}=\ldots=V_3=V_2$ when the seeking speed of the pick-up head is constant, whether, as regards the TEZC signal, the pulse width corresponding to its upper half cycle is larger than the pulse width corresponding to its lower half cycle because of the downward slice level shift, or the pulse width corresponding to its lower half cycle is larger than the pulse width corresponding to its upper half cycle because of the upward slice level shift.

As indicated earlier, the TEZC signal compensated by the moving average compensation method in accordance with the present invention has nothing to do with the question whether its slice level is precisely positioned at the center. The genuine TEZC signal can be recovered with the compensation method in accordance with the present invention, as long as its slice level lies between the maximum peak value and the minimum peak value of the TE signal.

On calculation, the half-track seeking speed may be figured out, using the recovered TEZC signal. As shown in FIG. 5, the dotted line denotes the seeking speed curve plotted in accordance with the uncompensated TEZC signal, wherein its upper half cycle and its adjoining lower half cycle, both of them corresponding to the slice level, are not equal in pulse width, ending up with the seeking speed curve characterized by the fluctuating seeking speed. Also, as shown in FIG. 5, the solid line denotes the seeking speed curve plotted in accordance with the compensated TEZC signal, wherein the seeking speed curve is a straight line because the pick-up head moves with constant speed.

Figure 6:
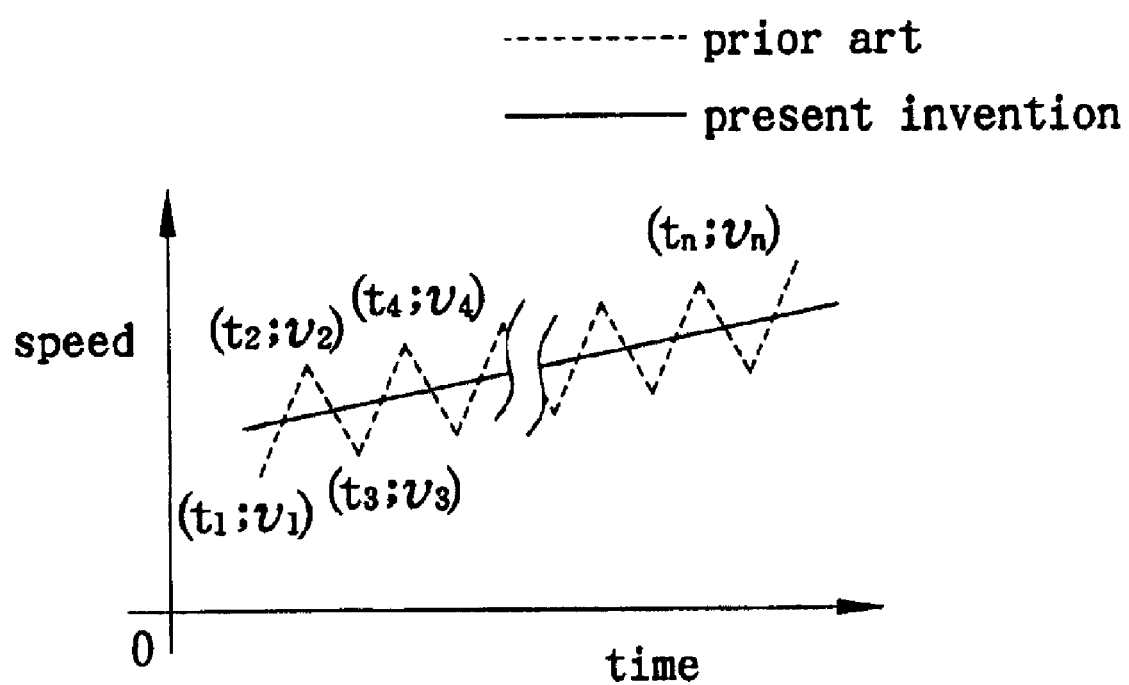
FIG. 6 is a seeking speed graph in comparison between the present invention and a prior art.

On the other hand, even if the seeking speed is not constant, for example, during acceleration or deceleration, the underlying principle remains unchanged, that is, still taking the average of the respective pulse widths of an upper half cycle and an adjoining lower half cycle of the TEZC signal or the RFZC signal wherein both the upper half cycle and the lower half cycle are decided by a slice level. As shown in FIG. 6, the pick-up head is accelerating. Similarly, the dotted line denotes the seeking speed curve plotted in accordance with the uncompensated TEZC signal wherein the curve still fluctuates while it extends along the actual seeking speed curve, but the solid line that represents the genuine seeking speed curve given by the present invention.

The moving average compensation method proposed by the present invention can be executed by utilizing a microprocessor or digital signal processor to run a software code or by hardware circuit. The disclosure does not limit the scope of the present invention.

As shown in FIG. 6, the series of the half-track seeking speed derived from the uncompensated TEZC signal is designated by $u_1, u_2, u_3, \ldots$, and $u_n$, respectively, have their corresponding values on the time axis designated by $t_1, t_2, t_3, \ldots, t_n$. The present invention of the moving average compensation method has another mathematical expression as follows:

$$V_i = \frac{(v_{i-1} + v_i)}{2};$$

wherein $V_i$ represents a compensated half-track seeking speed and is the same as the aforesaid one. The solid line can be drawn from these compensated half-track seeking speeds. The series in FIG. 6 are also derived from an uncompensated RFZC signal.

The above-described embodiments of the present invention are intended to be illustrative only. Numerous alternative embodiments may be devised by persons skilled in the art without departing from the scope of the following claims.

What is claimed as new and desired to be protected by Letters Patent of the United States is:

1. A compensation method for detecting the seeking speed of a pick-up head in an optical disk drive, comprising the steps of:
   converting a tracking error (TE) signal into a tracking error zero cross (TEZC) signal;
   averaging the pulse widths of a plurality of adjacent pulses on the TEZC signal to derive an average; and
   designating the average as the pulse width of a recovered TEZC signal.

2. The compensation method for detecting the seeking speed of a pick-up head in an optical disk drive of claim 1, wherein the number of adjacent pulses to be averaged is two.

3. The compensation method for detecting the seeking speed of a pick-up head in an optical disk drive of claim 1, further comprising the step of:
   deriving the seeking speed from the recovered TEZC signal.

4. The compensation method for detecting the seeking speed of a pick-up head in an optical disk drive of claim 3, wherein the seeking speed is a constant.

5. The compensation method for detecting the seeking speed of a pick-up head in an optical disk drive of claim 3, wherein the seeking speed has acceleration.

6. The compensation method for detecting the seeking speed of a pick-up head in an optical disk drive of claim 1, further comprising the steps of:
   converting an RF ripple signal into an RF ripple zero cross (RFZC) signal;
   averaging the pulse widths of a plurality of adjacent pulses on the RFZC signal to derive an average; and
   designating the average as the pulse width of a recovered RFZC signal.

7. The compensation method for detecting the seeking speed of a pick-up head in an optical disk drive of claim 1, further comprising the step of:
   employing the pulse width of the recovered TEZC signal to assist the feedback control of the seeking speed of the pick-up head.

8. A compensation method for detecting the seeking speed of a pick-up head in an optical disk drive, comprising the steps of:

converting a TE signal into a TEZC signal;
deriving a series of half-track seeking speeds from the TEZC signal;
averaging a plurality of successive half-track seeking speeds to derive an average; and
designating the average as a recovered half-track seeking speed.

9. The compensation method for detecting the seeking speed of a pick-up head in an optical disk drive of claim 8, wherein the number of adjacent half-track seeking speeds to be averaged is two.

10. The compensation method for detecting the seeking speed of a pick-up head in an optical disk drive of claim 8, further comprising the steps of:
converting an RF ripple signal into an RFZC signal;
deriving a series of half-track seeking speeds from the RFZC signal;
averaging a plurality of successive half-track seeking speeds derived from the RFZC signal to derive an average; and
designating the average as a recovered half-track seeking speed.

11. A compensation method for detecting the seeking speed of a pick-up head in an optical disk drive, comprising the steps of:
converting an RF ripple signal into an RFZC signal;
deriving a series of half-track seeking speeds from the RFZC signal;
averaging a plurality of successive half-track seeking speeds to derive an average; and
designating the average as a recovered half-track seeking speed.

12. The compensation method for detecting the seeking speed of a pick-up head in an optical disk drive of claim 11, wherein the number of adjacent half-track seeking speeds to be averaged is two.

13. The compensation method for detecting the seeking speed of a pick-up head in an optical disk drive of claim 11, further comprising the step of:
employing the pulse width of the recovered half-track seeking speed to assist the feedback control of the seeking speed of the pick-up head.

* * * * *